United States Patent
Igawa et al.

(10) Patent No.: US 6,596,190 B1
(45) Date of Patent: Jul. 22, 2003

(54) REMEDIATION AGENT FOR CONTAMINATED SOIL AND METHOD FOR THE REMEDIATION OF SOIL

(75) Inventors: Junji Igawa, Kitakyushuu (JP); Yasunori Kimura, Tokyo (JP); Terunobu Maeda, Tokyo (JP)

(73) Assignees: Hazama Corp., Tokyo (JP); Toyo Ink Mfg., Tokyo (JP)

( * ) Notice: Subject to any disclaimer, the term of this patent is extended or adjusted under 35 U.S.C. 154(b) by 0 days.

(21) Appl. No.: 09/806,348

(22) PCT Filed: Jul. 28, 2000

(86) PCT No.: PCT/JP00/05111

§ 371 (c)(1),
(2), (4) Date: Mar. 29, 2001

(87) PCT Pub. No.: WO01/08825

PCT Pub. Date: Feb. 8, 2001

(30) Foreign Application Priority Data

Jul. 29, 1999 (JP) .............................. 11-215402
Jan. 19, 2000 (JP) ....................... 2000-010881
Jan. 27, 2000 (JP) ....................... 2000-018857

(51) Int. Cl.$^7$ .............................. A62D 3/00; B01F 3/06; C09K 17/02; B09B 3/00
(52) U.S. Cl. .................. 252/188.1; 588/221; 588/236; 588/248; 588/205; 405/128.5; 405/128.75; 516/95
(58) Field of Search ................................ 588/231, 236, 588/223, 224, 205, 206, 207, 218, 221, 248, 901; 405/128.1, 128.15, 128.45, 128.5, 128.7, 128.75; 75/300, 710; 516/78, 95; 137/170.1; 210/221.1, 221.2; 252/188.1

(56) References Cited

U.S. PATENT DOCUMENTS 2,182,384 A * 12/1939 McGregor ...................... 252/1
2,580,409 A * 1/1952 Cornish ....................... 210/711

(List continued on next page.)

FOREIGN PATENT DOCUMENTS

| JP | 55048274 | 4/1980 |
| JP | 03030895 | 2/1991 |
| JP | 03106496 | 5/1991 |
| JP | 5501520 | 3/1993 |
| JP | 05311253 | 11/1993 |
| JP | 07308682 | 11/1995 |
| JP | 08257570 | 10/1996 |
| JP | 2636171 | 4/1997 |
| JP | 09239339 | 9/1997 |
| JP | 10071386 | 3/1998 |
| JP | 10263522 | 10/1998 |
| JP | 2000135483 | 5/2000 |
| WO | WO 9108176 | 6/1991 |

*Primary Examiner*—Steven Bos
*Assistant Examiner*—Anthony Kuhar
(74) *Attorney, Agent, or Firm*—Birch, Stewart, Kolasch & Birch, LLP

(57) ABSTRACT

A method for the remediation of contaminated soil directly and effectively removes the contaminants such as organic halides from the contaminated soil, using remediation agents for soil. In more detail, the agents include a slurry of fine iron particles in which the fine iron particles having average particle size less than 10 μm are dispersed in water; and an aqueous suspended liquid that contains fine iron particles having average particle size less of 1 to 200 μm and a hydrophilic binder; and these agents are employable for the method for the remediation of contaminated soil.

14 Claims, 3 Drawing Sheets

U.S. PATENT DOCUMENTS

| | | | | |
|---|---|---|---|---|
| 4,601,832 A | * | 7/1986 | Hooykaas | 588/236 |
| 4,737,272 A | * | 4/1988 | Szatkowski et al. | 209/164 |
| 5,202,033 A | * | 4/1993 | Stanforth et al. | 210/747 |
| 5,431,825 A | * | 7/1995 | Diel | 210/719 |
| 5,458,437 A | * | 10/1995 | Jaffe et al. | 405/128.15 |
| 5,569,152 A | * | 10/1996 | Smith | 588/256 |
| 5,609,558 A | * | 3/1997 | Sasae et al. | 588/257 |
| 5,658,097 A | * | 8/1997 | Komori et al. | 405/263 |
| 5,975,798 A | * | 11/1999 | Liskowitz et al. | 210/747 |
| 6,068,777 A | | 5/2000 | Kimura et al. | |
| 6,242,663 B1 | * | 6/2001 | Ponder et al. | 588/205 |
| 6,280,625 B1 | * | 8/2001 | Jackson et al. | 210/617 |
| 6,303,367 B1 | * | 10/2001 | Kataoka et al. | 435/262.5 |
| 2002/0030022 A1 | * | 3/2002 | Bradley | 210/752 |

* cited by examiner

REMEDIATION AGENT FOR CONTAMINATED SOIL AND METHOD FOR THE REMEDIATION OF SOIL

This application is the national phase under 35 U.S.C. §371 of PCT International Application No. PCT/JP00/05111 which has an International filing date of Jul. 28, 2000, which designated the United States of America and was published in English.

DETAILED DESCRIPTION OF THE INVENTION

Technical Field to Which the Invention Pertains

The present invention relates to a remediation agent for soil contaminated with contaminants such as organic halides and hexavalent chromium, a slurry of fine iron particles suitably employable for the agent and process for the preparation thereof, and a method for the remediation of contaminated soil.

BACKGROUND OF THE INVENTION

Volatile organic halides such as trichloroethylene have been employed in a large amount to industrially wash various machines for removal of stain-containing oils. The use of the organic halides has been increasingly regulated from the consideration of environment pollution. However, a large amount of organic halides already have been employed, and therefore soil and groundwater pollutions have been widely advanced. In more detail, the organic halides such as trichloroethylene are stable and scarcely decomposed by microorganisms, and hence the organic halides abandoned in the soil not only contaminate the soil per se, but also finally do the river or groundwater that is occasionally source for drinking water. Similarly, such environment pollution has also occurred in a site where a factory is removed but hexavalent chromium remains.

Examples of methods for remedying the soil contaminated with volatile organic compounds such as the organic halides include soil-gas sucking method, groundwater pumping-up method, and soil-digging method. The soil-gas sucking method is of coercively sucking aimed substances existed in an unsaturated zone (layer). This method comprises providing wells for suction in the soil (land formation) by boring, reducing the pressure within the wells by a suction pump, collecting the vaporized organic compounds into the wells, and leading the compound to the underground to cause them to be adsorbed by activated carbon for treatment. In the case that the contamination by the organic compounds extends to an aquifer, adopted is a method comprising providing a water pump within the suction wells and pumping up water together with soil-gas to treat them.

The groundwater pumping-up method is performed by providing pumping-up wells within the soil and pumping up contaminated groundwater to treat it. Further, the soil-digging method is done by digging the contaminated soil and subjecting the dug soil to a wind drying and heat treatment to remove and collect the organic compounds.

A method for the remediation of contaminated water that are collected in the above manner or of contaminated groundwater, is disclosed in for example Patent Gazette No. 2636171. The method comprises removing oxygen dissolved in the contaminated water, bringing the water into contact with the surface of metal such as iron, and reducing organic halides contained in the water to remove. Such methods utilizing the reducing action of iron are also described in, for example, JP-A03-106496, JP-A03-30895, JP-A05-501520, JP-A08-257570, JP-A10-263522. Any of these methods have a feature comprising passing the contaminated water through a layer or filter containing iron to treat the water.

As for the soil contaminated with the hexavalent chromium, there is known the method of remedying the soil by the use of a reducing agent such as iron (II) sulfate. However, when the hexavalent chromium is existed in the soil in the form of bulk containing trivalent and hexavalent chromium's such as chromium slag, the iron (II) sulfate is not sufficiently capable of reducing the chromium because it shows reducing action only for short time. Accordingly, there is desire to have a remediation agent showing reducing action for a long-term period.

OBJECT TO BE SOLVED BY THE INVENTION

The object of the present invention is to provide the remediation agent for soil that can directly and effectively render the contaminants such as organic halides, hexavalent chromium in the soil nontoxic through reduction of the contaminants, or render the contaminants nontoxic and remove them; a slurry of fine iron particles suitably employable for the agent and a process for the preparation thereof, and a method for the remediation of contaminated soil by use of the agent.

MEANS TO SOLVE THE OBJECT

Methods for the remediation of contaminated soil with organic halides that have been carried out so far, include those comprising collecting contaminated water from contaminated soil to remedy the water, or comprising collecting contaminated soil to remedy the soil. These methods are not those of directly and effectively remedying the contaminated soil per se.

The present inventors have noted iron having action of reducing and decomposing the organic halides (in other word, dehalogenation) and have studied to develop the above-mentioned process for easily remedying the contaminated soil by utilizing the iron.

The inventors have found by the study the following matter: i.e., the fine iron particles that are employed in the conventional method for the remediation have a relatively large average particle size of several tens to several hundreds $\mu$m and further are unsettled in their shapes; and therefore when the above fine iron particles, for example in the form of their aqueous dispersion, are applied to the contaminated soil, the fine iron particles is not capable of sufficiently penetrating into the soil. The inventors have further studied based on the above findings to solve the above problem by rendering the particles fine to enlarge the surface area, whereby they have attained the invention.

Further, the inventors have found that in addition to increase of disposal capacity of contaminants by increase of the surface area of iron, to render the shape of the iron particle spherical enables the iron particles to rapidly penetrate into the soil. As mentioned above, the conventional fine iron particles used for the remediation have particle size of not less than several tens $\mu$m, whereas the fine iron particles of the invention has particle size of less than 10 $\mu$m, and therefore have remediation capacity two or more times (occasionally ten or more times) that of the conventional fine iron particles. Further in the case that the shape of the particles is spherical, the particles show extremely excellent penetration property compared with the conventional unsettled those.

Hence, the object of the invention is solved by a remediation agent for contaminated soil (agent for remedying contaminated soil), comprising a slurry of fine iron particles in which the fine iron particles (preferably those in the form of sphere) having an average particle size of less than 10 $\mu$m (preferably 0.1 to 6 $\mu$m) are dispersed in water (a first invention).

Moreover, the inventors have studied to enhance the workability when the aqueous suspension containing the above fine iron particles is applied to the soil, by maintaining stable dispersibility and reduced viscosity of the suspension. As a result, they have found that it gives a remediation agent suitable for the above-mentioned simple remediation method to use the fine iron particles that disperses the particles in water via bubbles formed on the periphery of the particles, to attain the present invention. In more detail, such a remediation agent in the form of aqueous suspension can be easily and directly applied to the soil, and can easily penetrate into the soil to bring about rapid remediation.

Further, the reducing agent of the fine iron particles have been found to be effective to contaminants to be reduced, especially hexavalent chromium-containing compounds.

Accordingly, the object of the invention is solved by a remediation agent containing a slurry of fine iron particles (aqueous suspension of fine iron particles) wherein the fine iron particles having an average particle size of less than 10 $\mu$m (preferably 0.1 to 6 $\mu$m) are dispersed via bubbles formed on the periphery of the particles (preferred embodiment of the first invention).

Further, the object of the invention is solved by a method for the remediation of contaminated soil comprising causing the remediation agent for contaminated soil as mentioned above to penetrate into the soil, in which the agent renders the contaminants such as organic halides, hexavalent chromium, especially organic halides in the soil nontoxic through reduction of the contaminants, or render the contaminants nontoxic and remove them (a second invention). It is preferred that the remediation agent is applied to the whole surface of the soil; and that the penetration of the remediation agent is carried out by inserting an injection pipe in the soil and injecting the agent into the pipe.

Moreover, the inventors have found a remediation agent for removing organic halide from soil contaminated with it, comprising an aqueous suspended liquid that contains fine iron particles having average particle size of 1 to 200 $\mu$m and a hydrophilic binder (a third invention). They have further found a remediation agent (in the form of powder or pellet) comprising fine iron particles on which a hydrophilic binder is coated, the agent being useful for the preparation of the above aqueous suspension.

In the above remediation agent, the hydrophilic binder is considerably adsorbed onto the surface of the fine iron particles, and therefore the agent that has been applied to the soil shows decreased level of contact with oxygen, whereby the oxidation of the fine iron particles is depressed. As a result, it is possible for the fine iron particles to show the reducing action for a long-term period.

The above-mentioned fine iron particles preferably have an average particle size of 1 to 50 $\mu$m, especially 1 to 15 $\mu$m. The above aqueous suspension preferably contains further metal sulfate (especially iron (II) sulfate) as a reducing agent. The aqueous suspension preferably contains further inorganic carbonate or carbonate containing mineral. Moreover, the fine iron particles is preferably coated with a hydrophilic binder.

In the remediation agent comprising an aqueous suspended liquid that contains fine iron particles and a hydrophilic binder according to the invention, the remediation agent in the form of powder comprising fine iron particles on which a hydrophilic binder is coated, and the remediation agent in the form of pellet comprising fine iron particles on which a hydrophilic binder is coated are preferably employable. Generally, these remediation agents are employed by dispersing or suspending them in water. These remediation agents have the fine iron particles that are approximately covered with the binder and therefore little oxidized by oxygen in air during their storage. Further, when the agents are applied to the contaminated soil, the fine iron particles of the agent are prevented from contacting with oxygen, whereby the oxidation of the fine iron particles is depressed. As a result, it is possible for the reducing action by the fine iron particles to show for a long-term period. Further the use of biodegradable polymer instead of the above hydrophilic binder is especially effective in secondary environmental pollution.

The above remediation agent (the third invention) is also preferably employable for the method (the second invention) mentioned previously.

Further, a remediation agent for removing organic halide from soil contaminated with it, comprising an aqueous suspended liquid that contains fine iron particles and metal halide is also useful. In this remediation agent, the activity of the surface of the fine iron particles is maintained by allowing metal halide (e.g., NaCl) to exist in the agent, the metal halide destroying passivation portion of the iron, whereby it is possible for the fine iron particles to show the reducing action for a long-term period.

Further, the invention lies in a slurry of fine iron particles in which the fine iron particles in the form of sphere having an average particle size of less than 10 $\mu$m are dispersed in water (a forth invention). The average particle size is preferably in the range of 0.1 to 6 $\mu$m, especially 0.1 to 3 $\mu$m. This extremely small size is capable of bringing about greatly enhanced remedial property. Further, the slurry preferably contains an anti-oxidizing agent, whereby the fine iron particles can be kept not to be oxidized. Further, the solid content of the slurry preferably is in the range of 20 to 70% by weight, especially 30 to 50% by weight.

The above slurry of fine iron particles can be advantageously obtained by a process comprising collecting a waste gas that contains steelmaking dust produced from an oxygen-blowing converter for steelmaking during refining and then removing gas to obtain slurry of the steelmaking dust (a fifth invention).

MODE FOR CARRYING OUT THE INVENTION

The slurry of fine iron particles used in the first invention according to the present invention is characterized in that the slurry contains the fine iron particles having an average particle size of less than 10 $\mu$m (and preferably spherical shape). The remediation agent for soil comprising the aqueous suspension containing the slurry is useful in rendering the contaminants in the soil nontoxic through reduction of the contaminants, or rendering the contaminants nontoxic to remove them.

The remediation agent for soil of the third invention according to the invention comprises an aqueous suspended liquid that contains fine iron particles having an average particle size less of 1 to 200 $\mu$m and a hydrophilic binder.

Though both the above agents enable simple remediation of contaminated soil, the former is especially improved in penetrability and the latter is especially improved in stability.

The contaminants that are the objects to be remedied (purified) in the invention are, for example, organic halides, hexavalent chromium-containing compounds and cyanides. Of organic halides and hexavalent chromium-containing compounds, especially organic halides, are preferred. Examples of the organic halides include 1,1-dichloroethylene, 1,2-dichloroethylene, trichloroethylene, tetrachloroethylene, dichloromethane, tetrachloromethane, 1,2-dichloroethane, 1,1,1-trichloroethane, 1,1,2-trichloroethane, 1,1,2,2-tetrachloroethane and dichlorodifluoroethane. It is considered that these organic halides lose halogen by dehalogenation (reducing action) to be converted into the corresponding hydrocarbons, which can be removed from soil. Of organic halides, organic chlorides (chlorine-substituted organic compounds) are preferred. The hexavalent chromium of the hexavalent chromium-containing compounds is reduced in high efficiency to trivalent chromium by the reducing action of iron given for long-term period. Then, the resultant trivalent chromium can be removed, if necessary. Further, the cyanides are generally rendered non-toxic by forming complex with iron ion.

The fine iron particles used in the remediation agent for soil of the first invention according to the invention, which is contained in the slurry, are extremely finely divided particles, and therefore rapidly penetrate into the soil when the agent is applied to the soil. The particle size generally is less than 10 $\mu$m, preferably in the range of 0.1 to 6 $\mu$m, especially 0.1 to 3 $\mu$m. Such fine iron particles (iron powder) having extremely small particle size enable great enhancement of remediation performance. Further, in the case that the extremely fine iron particles further have spherical shape, the particles more rapidly penetrate into the soil when applied to it whereby they show remediation activity. Of these slurries, the slurry having the above particles size and spherical shape (a forth invention) is novel and preferred.

The above-mentioned slurry preferably has a solid content of 20 to 70% by weight, especially 30 to 50% by weight. Further, the slurry preferably contains anti-oxidizing agent, whereby the oxidation of iron can be prevent. In the total solid content, the total amount of metallic iron and iron-containing compounds is generally not less than 90% by weight, and the metallic iron is not less than 30% weight occupied in the solid content.

The slurry of the above-mentioned forth invention preferably includes a slurry of steelmaking dust obtained by a process which comprises collecting a waste gas containing steelmaking dust generated from an oxygen-blowing converter for steelmaking during refining and then removing gas (e.g., carbon dioxide) to obtain a slurry of the steelmaking dust. In the process, the collecting of waste gas is preferably carried out by using wet dust collection. After the collecting of the waste gas, the steelmaking dust is generally collected by settling using a thickener to form a slurry of fine iron particles sludge, i.e., the above-mentioned slurry of steelmaking dust. If desired, high quality iron powder (e.g., one for toner) can be added to the steelmaking dust to form the slurry.

An example of the process for preparing the slurry of fine iron particles according to the invention (a fifth invention) is illustrated by reference to FIG. 1.

In the oxygen-blowing converter for steelmaking, pig iron or the like containing impurities such as C, Si and P is placed, and oxygen gas is rapidly blown from the upper side with stirring the pig iron, whereby the pig iron containing the impurities such as C, Si and P reacts with the oxygen to convert the impurities into the oxides and the iron into steel.

The above-mentioned oxygen gas blowing gives waste gas containing iron powder (iron particles), which is passed through a hood for recovering gas to be collected by means of wet dust collection. In the wet dust collection, gas such as CO is fed to a tank for recovering gas. A steelmaking dust obtained by the dust collection is in the form of slurry, and this slurry is subjected to a step of sizing based on coarse particle (60 $\mu$m) to be divided into coarse one and fine one. The coarse one is recovered as coarse iron particles, and the fine one is concentrated by a thickener and separated by a filter press to select extremely fine one that is fine iron particles (i.e., slurry of fine iron particles).

The resultant fine iron particles include iron oxides having various oxidation numbers, which are considered to show reducing action giving remedial action because such the iron oxides are also dust captured in the gas burning condition that is in the reducing state. Accordingly, even fine iron particles not having 30 or more % by weight of metallic iron generally show high reducing action.

In the above coarse iron particles, 97% by weight of Fe has, for example, the following particle size.

TABLE 1

| 97 wt. % Fe | Total amount/metal (Unit: T/M (throughout per month)) | Distribution of particle size |
|---|---|---|
| ≦70 $\mu$m | 50 | 60–70 $\mu$m: 5% |
| ≦80 $\mu$m | 100 | 60–90 $\mu$m: 10% |

The above fine iron particles has, for example, the following composition.

TABLE 2

| Slurry | Water content | Wet powder (Unit: T/D (throughout per day)) | Water | SS | Metallic iron | Wet powder (Unit: T/M (throughout per month)) | Metallic iron |
|---|---|---|---|---|---|---|---|
| After filter press | 35% | 150 | 53 | 98 | 20 | 4200 | 546 |
| Slurry 70 (product) | 70% | 325 | 228 | 98 | 25 | 9100 | 683 |

Note (Abbreviations):
SS: Floating substances; Wet powder: Iron powder containing water.

The above fine iron particles has, for example, the following components.

TABLE 3

| Slurry | Metallic iron | FeO | Fe$_2$O | Total of iron | CaO | SiO$_2$ |
|---|---|---|---|---|---|---|
| After filter press | 11–18 | — | — | 67–71 | 3–5 | 0.4–1.0 |
| Slurry 70 (product) | 29–44 | 32–38 | — | 67–75 | — | — |

Note: the units of the values are wt. %.

As shown above, the by-produce obtained during the steelmaking can be used as the fine iron particles of the invention. Such the by-product does not require a special process or special device for preparing the fine iron particles, and therefore the fine iron particles of the invention are easily obtainable and economical. The fine iron particles are obtained as slurry, and hence it is possible to prevent the surfaces of the iron particles from oxidizing and similarly do them from oxidizing during the transport. In the transport of the slurry, it is preferred to stir the slurry to prevent the iron particles from precipitating or solidifying. Further, in order to prevent the surface of the iron particles from oxidizing, it is preferred to add an anti-oxidizing agent to the slurry. Examples of the anti-oxidizing agent include organic acids such as ascorbic acid (vitamin C), citric acid and malic acid, especially ascorbic acid, and salts thereof. The anti-oxidizing agent is generally used in the rage of 0.01 to 10% by weight, preferably 0.1 to 3% by weight, based on the amount of the fine iron particles. Furthermore, the fine iron particles have an advantage that the fine iron particles can be easily mixed with other materials on the preparation because of the form of slurry.

The remediation agent for soil containing the fine iron particles according to the invention can contain metals other than iron showing reducing action, for example, Mn, Mg, Zn, Al, Ti. These metals have preferably smaller average particle size.

Further, in the first invention, that is the remediation agent for contaminated soil comprising a slurry of iron particles in which the iron particles having an average particle size of less than 10 $\mu$m are dispersed in water, it is preferred that the dispersion condition is stabilized by the bubbles formed on the periphery of the iron particles. In more detail, as iron powder of a remediation agent for soil, the above-mentioned iron particles having extremely small particle size is employed because it rapidly penetrate into soil after it is directly applied to a contaminated soil. The shape of the iron particles is generally indefinite shape, but also preferably in the form of sphere. The remediation agent of which dispersion condition is stabilized via the bubbles formed on the periphery of the iron particles, is effective in the use of iron particles having particle sizes except the above particle size range. The agent can use iron particles having average particle size of, for example, 0.1 to 200 $\mu$m, preferably 0.1 to 50 $\mu$m, especially 0.1 to 15 $\mu$m.

In the above the remediation agent having bubbles, the formation of bubbles on the periphery of the iron particles to stabilize its dispersibility are performed by adding a frother (forming agent) to the fine iron particles and water and mixing them (preferably vigorously mixing them), or by introducing gas such as air into the fine iron particles and water, or by combination of them (i.e., the mixing of particles and water and the introducing of gas). If desired, a frother may be employed. The frother is preferably used, because the iron particles should be stabilize in water by attaching bubbles onto peripheries thereof.

Examples of the frother include animal proteins such as egg albumen, saponin and gelatin; decomposition products of animal proteins; anionic surfactants such as salts of higher fatty acids, alkyl sulfates, salts of sulfuric acid ester of higher alcohols, alkyl sulfonates, alkyl benzene sulfonates, alkyl sulfosuccinates, polyoxyalkylether sulfates, lignin sulfonates and abietates; cationic surfactants such as alkyl amine salts, ammonium salts, alkyl betaines and amine oxides; saponification products of vegetable essential oils (examples of the oils: rosin, scrap rosin, camphor oil, eucalyptus oil); nonionic surfactants such as polypropylene glycol, polyethylene glycol, polyoxyalkylene alkyl ether, polyoxyalkylene aryl ether and alkyl alcohol of carbon atoms 5 to 8; terpineol derivatives; camphor derivatives; fatty acid esters of sorbitans. These materials can be employed in a combination thereof. As the frother, it is preferred to use air entraining agents (AE agents) for concrete (or cement) or floatation reagents, especially air entraining agents. Examples of the air entraining agents (especially forming agent for concrete) include decomposition product of animal protein (e.g., Trade name: Escoat K, manufactured from Manol Co., Ltd.), saponification product of scrap rosin (sodium abietate) (e.g., Trade name: Winsol, manufactured from Sannei Chemical Co., Ltd.), salts of sulfuric acid ester of higher alcohols (e.g., Trade name: Finefoam, manufactured from NMB Co. Ltd.). These materials are also used for floatation reagent. Examples of the floatation reagents other than the above materials include polypropylene glycol, terpineol derivatives, camphor derivatives, methylisobutylcarbitol and alkyl alcohol of carbon atoms 5 to 8.

The frother is generally used in the amount of 0.1 to 10% by weight, preferably 0.5 to 5% by weight based on the amount of the fine iron particles.

In order to attach bubbles onto the periphery of the iron particles to stabilize its dispersibility, a process in which the fine iron particles and water are mixed and the frother is added to the mixture with vigorously mixing it to form bubbles (the frother may be added from the beginning), or a process in which air is brown in the mixture of water using a compressor and the fine iron particles with vigorously mixing the mixture to form bubbles (a small amount of frother may be preferably added to the mixture), are generally utilized. Instead of air, gas that less shows oxidizing action such as nitrogen gas or carbon dioxide may be blown. Especially, the use of carbon dioxide permits the carbon dioxide to dissolve in water of the aqueous suspension (remediation agent for soil), whereby the contaminants contained in the soil can be easily eluted from the soil when the remediation agent penetrates the soil.

Mixers usually used in preparation of suspension or emulsion are utilized in the above mixing. Examples of the mixers include batch-wise mixers such as homomixer, toothed disc mixer, agihomomixer, combimix, kedymill and shaflow; continuous mixers such as pipe line mixer (high speed type), colloid mill, high line mill, homomic lineflow and high pressure homogenizer. Preferred are homomixer, toothed disc mixer, agihomomixer and combimix.

The stirring, when the homomixer is used, is carried out under the conditions of number of revolutions having generally 500 to 10,000 rpm, preferably 1000 to 6,000 rpm and temperature of generally 0 to 60° C., preferably 5 to 40° C., until the mixture is changed in the form of from liquid to homogeneous cream by bubbles. The above conditions are also applied to the case that other mixers are used.

The resultant suspension has a large amount of bubbles and therefore has apparent density lower than that of ordinary suspension. Hence, the bubble content is generally in the range of 5 to 80% by volume, preferably 30 to 60% by volume, especially 30 to 50% by volume, based on the total amount of the suspension. The more the bubbles, the dispersion stability is better, but the workability is poorer. Therefore the above range is preferred.

The resultant remediation agent for soil is essentially composed of the fine iron particles and water, and further a slight amount of frother. The fine iron particles are dispersed by attaching bubbles onto the periphery of the iron particles, and therefore the iron particles are prevented from precipitating to exhibit excellent workability. Hence, the remediation agent is injected into the soil, and then easily penetrates into the soil with disappearance of the bubbles. Thereby, the iron particles penetrate into the soil to reach the deep portion of the soil, and immediately exhibit the remedial action in the portion.

The fine iron particles used in the first invention have a large surface area, and the surface is occasionally oxidized or passivated. To inhibit the oxidation, in the invention, it is preferred to further use a hydrophilic binder and/or metal halide.

Examples of the metal halide include NaCl, KCl, $MgCl_2$ and $CaCl_2$. NaCl is preferred. The metal halide reduces iron hydroxide or oxide to metallic iron. The halide is generally used in the amount of 0.5 to 200% by weight, preferably 0.5 to 50% by weight based on the amount of the fine iron particles.

The hydrophilic binder covers the surface of the fine iron particles, whereby the surface is protected so as not to be oxidized until the metal halide exhibits reducing action. Examples of the hydrophilic binder include water-soluble resins, for example disaccharides such as sucrose, sucrose derivatives such as higher fatty acid ester of sucrose, monosaccharides such as glucose, alginic acid, pullulan, polyvinyl alcohol (PVA), carboxymethylcellulose (CMC), polyacrylamide, cyamoposis gum, methylcellulose and hydroxyethylcellulose. Preferred are pullulan (especially because of low viscosity of its aqueous solution), hydroxyethylcellulose, sucrose, glucose and PVA. Use of biodegradable polymer as the hydrophilic binder is effective in the prevention of secondary environmental pollution. The binder is generally employed in the amount of 0.01 to 200% by weight, preferably 0.01 to 100% by weight based on the fine iron particles.

The remediation agent of the first invention is obtained by adding to the slurry of fine iron particles, if desired, the anti-oxidizing agent, metal halide or hydrophilic binder, or a combination of metal halide and hydrophilic binder and then suspending or dispersing them. Further, it is possible to make the agent a desired concentration by adding an appropriate amount of water to it. Moreover, if desired, the surfactant can be also employed in the dispersing step. The use of biodegradable polymer (e.g., biodegradable polycaprolactone) instead of the hydrophilic binder is effective in the prevention of secondary environmental pollution.

The above-mentioned remediation agent for soil preferably further contains metal sulfates (especially iron (II) sulfate). The sulfates are reacted with oxygen in air, and therefore can prevent the surface of the fine iron particles from oxidizing.

The remediation agent for soil preferably further contains inorganic carbonates or minerals containing carbonate. The examples include calcium carbonate, precipitated calcium carbonate, magnesium carbonate, coral fossil limestone, limestone and dolomite. Preferred is precipitated calcium carbonate. The remediation agent for soil of the invention uses extremely fine iron particles and therefore the particles can be inserted into gap between the soil grains in the soil. However, since the fine particles are apt to dissolve in groundwater and the like, it is preferred that the dissolved iron ion is fixed using the carbonate to prevent from dissolving out.

The remediation agent for soil in the form of aqueous suspension according to the invention is, as mentioned above, obtained by adding to the slurry of fine iron particles, if desired the anti-oxidizing agent, metal halide or hydrophilic binder, or a combination of metal halide and hydrophilic binder and suspending or dispersing them. Water used in the preparation preferably is reducing electrolytic water (preferably pH=7–12). As a dispersing agent, a surfactant such as naphthalenesulfonate derivative may be employed. The dispersing agent is generally used in the amount of 0.01 to 10% by weight, preferably 0.1 to 5% by weight, especially 0.1 to 3% by weight based on the amount of the iron particles. Moreover, the above-mentioned anti-oxidizing agent may be employed in the range as above.

The remediation agent for soil of the third invention according to the invention generally uses the fine iron particles having an average particle size of 1 to 200 µm, preferably 1 to 50 µm, especially 1 to 15 µm, such that the iron particles can be directly applied to soil, i.e., the iron particles can penetrate into the soil after they are applied to the soil.

The fine iron particles can contain metals other than iron showing reducing action, for example, Mn, Mg, Zn, Al, Ti.

The fine iron particles used in the third invention have a large surface area, and the surface is easily oxidized or passivated. To inhibit the oxidation, in the invention, it is preferred to further use a hydrophilic binder and/or metal halide.

Examples of the metal halide include NaCl, KCl, $MgCl_2$ and $CaCl_2$. NaCl is preferred. The metal halide reduces iron hydroxide or oxide to metallic iron. The halide is generally used in the amount of 10 to 200% by weight, preferably 10 to 50% by weight based on the amount of the fine iron particles.

The hydrophilic binder covers the surface of the fine iron particles, whereby the surface is protected so as not to be oxidized until the metal halide exhibits reducing action. Examples of the hydrophilic binder include water-soluble resins, for example disaccharides such as sucrose, sucrose derivatives such as sucrose higher fatty acid ester, monosaccharides such as glucose, alginic acid, pullulan, polyvinyl alcohol (PVA), carboxymethyl cellulose (CMC), polyacrylamide, cyamoposis gum, methyl cellulose and hydroxyethyl cellulose. Preferred are pullulan (especially because of low viscosity of its aqueous solution), hydroxyethyl cellulose, sucrose, glucose and PVA. Use of biodegradable polymer as the hydrophilic binder is effective in the prevention of secondary environmental pollution. The binder is generally employed in the amount of 10 to 200% by weight, preferably 10 to 100% by weight based on the fine iron particles.

In one embodiment of the third invention, the remediation agent is obtained by suspending or dispersing the fine iron particles and hydrophilic binder or metal halide, or a combination of metal halide and hydrophilic binder in water. Moreover, if desired, the surfactant can be also employed in the suspending or dispersing procedure. However, the remediation agent in the form of powder comprising iron particles on which a hydrophilic binder is coated and the remediation agent in the form of pellet comprising iron particles and a hydrophilic binder is coated, are also preferably employable in the invention. These agents can be also fixed in the soil to remedy contaminated water by passing through it, without directly application to the soil. The use of biodegradable polymer (e.g., biodegradable polycaprolactone) instead of the hydrophilic binder is effective in the prevention of secondary environmental pollution, which also corresponds to the invention.

The remediation agent in the form of powder can be obtained by powdering an aqueous suspension or dispersion comprising a hydrophilic binder and fine iron particles by means of spray-drying or freeze-drying. In the freeze-drying, the resultant agent is generally required to further be ground. The remediation agent in the form of pellet can be obtained by mixing fine iron particles and a hydrophilic binder under melting and injecting the melt through a spray nozzle to mold (i.e., subjecting the melt to injection molding).

The above-mentioned remediation agent for soil in the form of aqueous suspension, powder or pellet, preferably further contains metal sulfates (especially iron (II) sulfate). The sulfates are reacted with oxygen in air, and therefore can prevent the surface of the fine iron particles from oxidizing.

The above remediation agent for soil preferably further contains inorganic carbonates or minerals containing carbonate. The examples include calcium carbonate, precipitated calcium carbonate, magnesium carbonate, coral fossil limestone, limestone and dolomite. Preferred is precipitated calcium carbonate. The remediation agent for soil of the invention uses extremely fine iron particles and therefore the particles can be inserted into gap between the soil grains in the soil. However, since the fine particles are apt to dissolve in groundwater and the like, it is preferred that the dissolved iron ion is fixed using the carbonate to prevent from dissolving out.

The remediation agent for soil in the form of aqueous suspension according to the invention is, as mentioned above, obtained by suspending or dispersing the above fine iron particles and hydrophilic binder or metal halide, or a combination of metal halide and hydrophilic. Water used in the preparation preferably is reducing electrolytic water (preferably pH=7–12) in view of depression of oxidation of iron. As a dispersing agent, a surfactant such as naphthalenesulfonate derivative may be employed. The dispersing agent is generally used in the amount of 0.01 to 10% by weight, preferably 0.1 to 5% by weight based on the amount of the iron particles. Further, as the anti-oxidizing agent, organic acids such as ascorbic acid, citric acid and malic acid may be employed. The anti-oxidizing agent is generally used in the amount of 0.01 to 10% by weight, preferably 0.1 to 3% by weight based on the amount of the iron particles.

The method for the remediation of soil containing contaminants (the second invention) according to the invention is, for example, carried out by causing the remediation agent for contaminated soil to penetrate into the soil contaminated with organic halides or the like. Preferably, there are a method that the penetration of the remediation agent for contaminated soil is carried out by spreading the agent over the soil (1), or a method that inserting an injection pipe in the soil and injecting the agent in the pipe (2).

The method (2) can be, for example, carried out in the following manner.

The injection pipe for feeding the remediation agent for soil is provided on the surface of the soil contaminated with organic halide by means of boring. If desired, plural injection pipes can be provided at a distance each other. The agent is injected into the pipe(s) for feeding, whereby the fine iron particles penetrate into the contaminated soil and come in contact with organic halide to gradually decompose and remove the halide. Before the insertion by the injection pipe, the groundwater may be discharged through the injection pipe, and then the agent may be injected into the pope. The surface of the soil may be covered with a water-impermeable sheet (e.g., bentonite sheet) such that the injected liquid (agent) does not flow over the surface. Otherwise, the sheet may be buried inside the soil.

The above process for the remediation may be carried out in the following manner. As shown in FIG. 2, a contaminated soil is surrounded by an impervious layer 12 to be cut off outside, the impervious layer extending to water-impermeable ground 11, and an injection pipe 9 is provided in the surrounded contaminated soil, if desired, a pervious column 2 and a horizontal pervious layer 4 are provided in the contaminated soil. Further, the contaminated soil is covered with an impervious sheet 6, periphery of which is fixed by an impervious layer 7 comprising size-containing back-filling sand to be cut off. In the horizontal pervious layer 4 is buried an intake pipe 5, i.e., perforated pipe that comprises a large number of pores having a size not to penetrate pervious materials 3.

A remediation process is, for example, carried out by taking water away by way of the injection pipe, injecting the remediation agent of the invention through the injection, if desired reducing pressure and removing substances generated by the diffusion of the agent and subsequently the reducing action of the iron.

As mentioned above, it is preferred to cover the surface of the soil contaminated with organic halide with an impervious sheet (which is generally provided after the injection of the remediation agent), and if desired, to provide the pervious column (which is effective for removal of the generated substances).

Soil contaminated with contaminants other than organic halides can be also remedied in the same manner as above. Otherwise, it may be advantageous that the contaminated soil (especially soil contaminated with hexavalent chromium) obtained by soil-digging method is introduced into a reaction tank to subjecting to remediation treatment and the treated chromium compounds is removed.

The iron particles of the remediation agent to be injected in the soil generally have a concentration of 0.1 to 50% by weight, preferably 1 to 30% by weight. The injection amount generally is 1 to 400 kg, preferably 100 to 200 kg based on 1 $m^3$ of soil.

The injection of the above remediation agent for soil may be performed by separating the injection of an aqueous suspension containing iron particles and that of other materials. The combination of materials to be injected can be appropriately selected. For example, metallic halide, a reducing agent, an aqueous solution of carbonate or a liquid of dispersing agent may be injected after the injection of an aqueous suspension containing iron particles.

The invention is illustrated in detail using the following Examples.

EXAMPLE 1

(a) Aqueous Suspension Containing a Slurry of Fine Iron Particles (Remediation Agent for Soil)

According to a process shown in FIG. 1 mentioned above, the fine iron particles were prepared according to the following manufacturing condition.

(Manufacturing Condition)

Device: Converter (upper blowing type) provided with oxygen gas treatment system, Volume of converter: 350 (T/times), wherein T is a weight of steel in the converter and is represented in terms of volume, Introduced pig iron: ratio of melted pig iron is 70 to 96%, Amount of blowing oxygen: blowing and mixing time is approx. 20 min., Rate of production of slurry: 250t/D (date).

The above process gave a slurry of fine iron particles (fine iron powder) having the following composition.

TABLE 4

| Slurry | Water content | Wet powder (Unit: T/D (throughout per day)) | Water | SS | Metallic iron | Wet powder (Unit: T/M (throughout per month)) | Metallic iron |
|---|---|---|---|---|---|---|---|
| After filter press | 35% | 150 | 53 | 98 | 20 | 4200 | 546 |
| Slurry 70 (product) | 70% | 325 | 228 | 98 | 25 | 9100 | 683 |

Note (Abbreviations):
SS: Floating substances; Wet powder: Iron powder containing water The above fine iron particles has the following components.

TABLE 5

| Slurry | Metallic iron | FeO | $Fe_2O$ | Total of iron | CaO | $SiO_2$ |
|---|---|---|---|---|---|---|
| After filter press | 18 | — | — | 71 | 4.5 | 0.4 |
| Slurry 70 (Product) | 29 | 38 | — | 67 | — | — |

Note: the units of the values are wt. %.

The fine iron particles contained in a slurry after the above filter press treatment, was confirmed to be in the form of sphere by means of an electronic microscope (20,000 times). Further, the particles size distribution showed the feature illustrated in FIG. 3. The average particle size was 1.3 μm.

The particles size distribution of the iron particles was measured under the following conditions.

Measuring device: SK Laser Micron Sizer 7000S

Dispersing medium: 0.2% NaHMP

Dispersing conditions: ultrasonic wave (U.S. WAVE) 5 min.

Volume fraction with respect to each of particle size illustrated in FIG. 3 is shown in Table 6.

TABLE 6

| Fraction | Particle size (μm) | Volume (%) |
|---|---|---|
| 1 | 0.1 | 11.1 |
| 2 | 0.2 | 16.9 |
| 3 | 0.4 | 25.3 |
| 4 | 0.6 | 31.4 |
| 5 | 0.8 | 36.2 |
| 6 | 1.0 | 40.2 |
| 7 | 1.5 | 59.5 |
| 8 | 2.0 | 81.1 |
| 9 | 3.0 | 91.1 |
| 10 | 4.0 | 97.3 |
| 11 | 6.0 | 100.0 |
| 12 | 8.0 | 100.0 |
| 13 | 12.0 | 100.0 |
| 14 | 16.0 | 100.0 |
| 15 | 24.0 | 100.0 |
| 16 | 32.0 | 100.0 |
| 17 | 48.0 | 100.0 |
| 18 | 64.0 | 100.0 |
| 19 | 96.0 | 100.0 |
| 20 | 128.0 | 100.0 |
| 21 | 192.0 | 100.0 |

To the slurry (Solid content: 65% by weight) after the above filter press treatment in a stirring tank, reducing electrolytic water was added, to give 30% by weight slurry, and 0.1% by weight of ascorbic acid was added to the slurry and then stirred to give a remediation agent for soil comprising a slurry of fine iron particles.

Subsequently, the above remediation agent (a) was continuously fed to a bead mill (device for dispersing), and after dispersing, HCl solution was added to the dispersion such that the dispersion had pH=4 that is measured by a pH meter as described below, and then the dispersion was mixed by a line mixer. After mixing, pH of the dispersion was measured by a pH meter, whereby the above-mentioned addition amount of HCl solution was adjusted, and thereafter, NaOH solution was added to the dispersion such that the dispersion had pH=7. Then, an aqueous dispersion containing 20% by weight of iron (II) nitrate and 0.1% by weight of ascorbic acid was added in the same amount as that of the above remediation agent (a) to the dispersion, and mixed by a line mixer. After the mixing, the mixture was measured on its pH by a pH meter to turn out a dispersion. The dispersion was continuously produced, and the resultant dispersion was continuously applied (injected) to a soil contaminated with trichloroethylene.

The above contaminated soil was composed of a broken stone layer in a region between the surface of the soil and depth of 30 cm, a silt layer in a region of depths of 30 cm to 2 m, and a clay layer in a region of depths of 2 m to 2 m 30 cm, and further had a slab plate on the surface of the soil. Twenty five holes (diameter: 10 cm) were bored in the slab plate, such that the holes were arranged at an interval of 3 m so as to form five rows of five holes in right and left directions (i.e., 5×5=25 holes). The suspension (remediation agent) was injected from these holes. The injection was carried out at 4 m³/h for 48 hours.

As a result, the concentrations of trichloroethylene in the soil were changed for one month as follows. The measurement was carried out in five points (set at random).

[Silt Layer]

(before injection→after 1 month from the injection (unit: ppm))

1) 1.85→<0.0005
2) 0.01→<0.0005
3) 3.22→<0.0005
4) 1.97→<0.0005
5) 0.08→<0.0005

[Clay Layer]

(before injection→after 1 month from the injection (unit: ppm))

1) 5.06→<0.0005
2) 1.03→<0.0005
3) 3.08→<0.0005
4) 1.53→<0.0005
5) 2.93→<0.0005

At the point most far from the injecting point (i.e., location of distance of 5 m from injection point and depth of 2 m) of the above five measuring points, the remediation agent showed effective remedial action. Hence, it is indicated that the remediation agent of the invention has excellent penetrability.

EXAMPLE 2

(a) Aqueous Suspension Containing Fine Iron Particles Having Bubbles Attached Thereto (Remediation Agent for Soil)

(Formulation)

| | |
|---|---|
| Fine iron particles | 65 wt. % |
| (Average particle size: 60 µm, shape: unsettled shape) | |
| Frother | 1 wt. % |
| (Trade name: Finefoam, available from NMB Co., Ltd.) | |
| Reducing electrolytic water | 34 wt. % |

The materials of the above formulation were mixed using a homomixer at number of revolutions of 3,000 rpm at temperature of 18° C. for 10 min., to give an aqueous suspension containing fine iron particles having bubbles attached thereto.

The resultant suspension was observed by a microscope to confirm that the fine iron particles had fine bubbles attached to the periphery thereof. Further, the resultant suspension had bubble content of 36% by volume based on the suspension.

(b) Aqueous Suspension Containing Fine Iron Particles Having Bubbles Attached Thereto (Remediation Agent for Soil)

(Formulation)

| | |
|---|---|
| Fine iron particles | 65 wt. % |
| (Average particle size: 1.3 µm, shape: sphere) | |
| Frother | 1 wt. % |
| (Decomposition product of animal protein, trade name: Escoat K, available from Manol Co., Ltd.) | |
| Reducing electrolytic water | 34 wt. % |

The materials of the above formulation were mixed using a homomixer at number of revolutions of 5,000 rpm at temperature of 20° C. for 5 min., to give an aqueous suspension containing fine iron particles having bubbles attached thereto.

The resultant suspension was observed by a microscope to confirm that the fine iron particles had fine bubbles attached to the periphery thereof. Further, the resultant suspension had bubble content of 44% by volume based on the suspension.

(c) Aqueous Suspension Containing Fine Iron Particles Having Bubbles Attached Thereto (Remediation Agent for Soil)

(Formulation)

| | |
|---|---|
| Fine iron particles | 50 wt. % |
| (Average particle size: 1.3 µm, shape: sphere) | |
| Frother | 1 wt. % |
| (Trade name: Finefoam, available from NMB Co., Ltd.) | |
| Reducing electrolytic water | 49 wt. % |

The materials of the above formulation were mixed using a toothed disc mixer at number of revolutions of 3,000 rpm at temperature of 30° C. for 10 min., to give an aqueous suspension containing fine iron particles having bubbles attached thereto.

The resultant suspension was observed by a microscope to confirm that the fine iron particles had fine bubbles attached to the periphery thereof. Further, the resultant suspension had bubble content of 32% by volume based on the suspension.

(d) Aqueous Suspension Containing Fine Iron Particles Having Bubbles Attached Thereto (Remediation Agent for Soil)

(Formulation)

Fine iron particles 50 wt. %
(Average particle size: 1.3 µm, shape: sphere)

| | |
|---|---|
| Frother | 1 wt. % |
| (Decomposition product of animal protein, trade name: Escoat K, available from Manol Co., Ltd.) | |
| Reducing electrolytic water | 49 wt. % |

The materials of the above formulation were mixed using a toothed disc mixer at number of revolutions of 5,000 rpm at temperature of 22° C. for 5 min., to give an aqueous suspension containing fine iron particles having bubbles attached thereto.

The resultant suspension was observed by a microscope to confirm that the fine iron particles had fine bubbles attached to the periphery thereof. Further, the resultant suspension had bubble content of 40% by volume based on the suspension.

(e) Aqueous Suspension Containing Fine Iron Particles Having Bubbles Attached Thereto (Remediation Agent for Soil)

(Formulation)

| | |
|---|---|
| Fine iron particles | 50 wt. % |
| (Average particle size: 1.3 µm, shape: sphere) | |
| Frother | 1 wt. % |
| (Saponification product of scrap rosin (sodium abietate), trade name: Winsol, available from Sannei Chemical Co., Ltd.), | |
| Reducing electrolytic water | 49 wt. % |

The materials of the above formulation were mixed using a toothed disc mixer at number of revolutions of 6,000 rpm at temperature of 25° C. for 15 min., to give an aqueous suspension containing fine iron particles having bubbles attached thereto.

The resultant suspension was observed by a microscope to confirm that the fine iron particles had fine bubbles attached to the periphery thereof. Further, the resultant suspension had bubble content of 35% by volume based on the suspension.

EXAMPLE 3

The remediation agents for soil (a) to (e) obtained in Example 2 were each injected into contaminated soil. The injection was carried out under the conditions of the contaminated soil of 200 m³, injection amount of suspension of 40 m³ and injection pitch (interval of injection pipe) of 2 m.

The concentrations of trichloroethylene in the soil were measured at four points to be changed after two weeks as follows.

Remediation Agents for Soil (a)
(20 wt. % liquid of the resultant suspension)
0.004→<0.0005, 0.013→<0.0005, 0.28→<0.0005, 0.46→<0.0005 (unit: ppm)

Remediation Agents for Soil (b)
(20 wt. % liquid of the resultant suspension)
0.023→<0.0005, 0.101→<0.0005, 0.57→<0.0005, 1.95→<0.0005 (unit: ppm)

Remediation Agents for Soil (c)
(20 wt. % liquid of the resultant suspension)
38.0→<0.0005, 15.9→<0.0005, 2.81→<0.0005, 1.00→<0.0005 (unit: ppm)

Remediation Agents for Soil (d)
(20 wt. % liquid of the resultant suspension)
110→<0.0005, 96.5→<0.0005, 70.3→<0.0005, 50.2→<0.0005 (unit: ppm)

Remediation Agents for Soil (e)
(20 wt. % liquid of the resultant suspension)
395→<0.0005, 211→<0.0005, 10.5→<0.0005, 36.5→<0.0005 (unit: ppm)

Remediation Agents for Soil for Comparison, i.e., 10 wt. % Liquid of Iron Particles (Average Particle Size: 1.3 μm, Shape: Sphere)
15.3→<0.0005, 9.6→<0.0008, 3.2→<0.0005, 0.08→0.0012 (unit: ppm)

At the point most far from the injecting point (i.e., location of distance of 4 m from injection point and depth of 4 m) of the above four measuring points, the remediation agent showed effective remedial action. Hence, it is indicated that the remediation agent of the invention has excellent penetrability.

EXAMPLE 4

(Stability of Suspension Containing Iron Particles)

The following suspensions (a), (a'), (d), (d') were made ready.

- (a): (a) Aqueous suspension containing fine iron particles having bubbles attached thereto obtained in Example 2;
- (a'): Aqueous suspension containing fine iron particles having bubbles attached thereto for comparison with (a), which was prepared in the same manner as in Example 2 except that 1% by weight of a specific carboxylic acid containing polymer dispersant (conventional pigment dispersant, trade name: Demol P, available from Kao Corp.) was used instead of the frother used in (a);
- (d): (d) Aqueous suspension containing fine iron particles having bubbles attached thereto obtained in Example 2;
- (d'): Aqueous suspension containing fine iron particles having bubbles attached thereto for comparison with (d), which was prepared in the same manner as in Example 2 except that 1% by weight of a specific carboxylic acid containing polymer dispersant (conventional pigment dispersant, trade name: Demol P, available from Kao Corp.) was used instead of the frother used in (d).

The above aqueous suspensions were each placed in a 100 ml graduated cylinder, and after the suspensions were allowed to stand for one week at temperature of 40° C., the precipitated conditions of the iron particles in the suspensions were observed. The obtained results were as follows:

- (a): The iron particles were present in the region of from the bottom to scale mark of 92 ml, whereas the supernatant liquid has little iron particles;
- (a'): The iron particles were present in the region of from the bottom to scale mark of 50 ml, whereas the supernatant liquid has little iron particles;
- (d): The iron particles were present in the region of from the bottom to scale mark of 97 ml, whereas the supernatant liquid has little iron particles;
- (d'): The iron particles were present in the region of from the bottom to scale mark of 60 ml, whereas the supernatant liquid has little iron particles.

The aqueous suspensions of (a') and (d') had a little bubbles, which was scarcely observed in the periphery of the iron particles.

EXAMPLE 5

(a) Aqueous Suspension Containing Fine Iron Particles and Hydrophilic Binder (Remediation Agent for Soil)

| (Formulation) | |
|---|---|
| Fine iron particles (Average particle size = 10 μm) | 100 g |
| Pullulan | 10 g |
| Dispersing agent | 10 g |
| (Polycondensation of sodium naphthalene sulfonate and formalin) | |
| Reducing electrolytic water | 880 g |

The mixture of the above formulation was circulated using a sand mill containing zirconia beads (volume: 0.6 L) for 3 hours to be dispersed. Thus, an aqueous suspension containing fine iron particles and hydrophilic binder was obtained.

(b) Aqueous Suspension Containing Fine Iron Particles and Hydrophilic Binder (Remediation Agent for Soil)

| (Formulation) | |
|---|---|
| Fine iron particles (Average particle size = 50 μm) | 100 g |
| Hydroxyethyl cellulose | 10 g |
| Reducing electrolytic water | 890 g |

The mixture of the above formulation was circulated using a sand mill containing zirconia beads (volume: 0.6 L) for 3 hours to be dispersed. Thus, an aqueous suspension containing fine iron particles and hydrophilic binder was obtained.

(c) Remediation Agent for Soil in the Form of Grain Containing Fine Iron Particles and Hydrophilic Binder

| (Formulation) | |
|---|---|
| Fine iron particles (Average particle size = 50 μm) | 100 g |
| Hydroxyethyl cellulose | 20 g |
| Reducing electrolytic water | 880 g |

The mixture of the above formulation was circulated using a sand mill containing zirconia beads (volume: 0.6 L) for 3 hours to be dispersed. The resultant dispersed liquid was subjected to freeze drying by the use of a freeze-drying machine, and the dried mixture was ground by a mixer. Thus, a remediation agent for soil in the form of grain containing fine iron particles and hydrophilic binder was obtained.

(d) Remediation Agent for Soil in the Form of Pellet Containing Fine Iron Particles and Hydrophilic Binder (Formulation)

| | |
|---|---|
| Fine iron particles (Average particle size = 150 $\mu$m) | 100 g |
| Higher fatty acid ester of sucrose | 50 g |

The mixture of the above formulation was melted in a mixer under heating at 65° C. and mixed under the heating for 3 hours to be dispersed. The resultant dispersed melt was subjected to injection molding to inject it through a spray nozzle. Thus, a remediation agent for soil in the form of pellet containing fine iron particles and hydrophilic binder was obtained.

(e) Remediation Agent for Soil in the Form of Powder Containing Fine Iron Particles and Hydrophilic Binder (Formulation)

Fine iron particles (Average particle size=100 $\mu$m) 100
Biodegradable polylactone 50g
(Placcel H7, available from Daicel Chemical Industries Ltd.)

The mixture of the above formulation was melted in a mixer under heating at 90° C. and mixed under the heating for 3 hours to be dispersed. The resultant dispersed melt was subjected to injection molding to inject it through a spray nozzle. Thus, a remediation agent for soil in the form of pellet containing fine iron particles and hydrophilic binder was obtained.

EXAMPLE 6

The remediation agents for soil (a) to (e) obtained in Example 5 were prepared and appropriately diluted with reducing electrolytic water with coercively stirring by the use of a homogenizer to prepare aqueous suspensions.

The resultant suspensions were each injected into soil contaminated with trichloroethylene. The injection was carried out under the conditions of the contaminated soil of 100 m³, injection amount of suspension of 40 m³ and injection pitch (interval of injection pipes) of 1 m. The concentrations of trichloroethylene in the soil were measured at four points to be changed after two weeks as follows.

Remediation Agents for Soil (a)
(The resultant suspension as it is)
 0.18→<0.0005, 0.29→<0.0005, 0.073→<0.0005, 0.031→<0.0005 (unit: ppm)
(Two-fold conc. liquid of the resultant suspension)
 0.28→<0.0005, 0.014→<0.0005, 0.80→<0.0005, 0.56→<0.0005 (unit: ppm)
Remediation Agents for Soil (b)
(The resultant suspension as it is)
 0.029→<0.0005, 0.022→<0.0005, 0.72→<0.0005, 0.67→<0.0005 (unit: ppm)
Remediation Agents for Soil (c)
(The resultant suspension as it is)
 1.08→<0.0005, 0.093→<0.0005, 2.30→<0.0005, 1.00→<0.0005 (unit: ppm)
Remediation Agents for Soil (d)
(10 wt. % solution of the resultant agent)
 2.11→<0.0005, 0.98→<0.0005, 0.051→<0.0005, 0.008→<0.0005 (unit: ppm)
Remediation Agents for Soil (e)
(10 wt. % solution of the resultant agent)
 1.77→<0.0005, 0.035→<0.0005, 0.020→<0.0005, 1.29→<0.0005 (unit: ppm)
Remediation Agents for Soil for Comparison, i.e., 10 wt. % Liquid of Iron Particles (Average Particle Size: 10 $\mu$m)
 0.15→<0.0005, 0.87→0.0008, 0.29→<0.0005, 1.0→0.0012 (unit: ppm)

At the point most far from the injecting point (i.e., location of distance of 2 m from injection point and depth of 2 m) of the above four measuring points, the remediation agent showed effective remedial action. Hence, it is indicated that the remediation agent of the invention has excellent penetrability.

EXAMPLE 7

In each of Glass-Vialses, 60 ml of trichloroethylene-containing water having concentration of 1200 mg/L was placed. Then, the suspensions (a) and (b), and only the fine iron particles in (a) and (b) were each added to the water so as to have the following concentrations. After shaking the above mixtures for eight hours, the mixtures exhibited the following concentrations of trichloroethylene.

| Remediation agent | Conc. of iron particles | Conc. of trichloro-ethylene |
|---|---|---|
| (a) of Example 1 | 5,000 ppm | 35 ppm |
| | 10,000 ppm | 2 ppm |
| Iron particles in (a) | 5,000 ppm | 410 ppm |
| | 10,000 ppm | 14 ppm |
| (b) of Example 1 | 5,000 ppm | 343 ppm |
| | 10,000 ppm | 11 ppm |
| Iron particles in (b) | 5,000 ppm | 750 ppm |
| | 10,000 ppm | 640 ppm |

BRIEF DESCRIPTION OF DRAWING

The present invention will become more fully understood from the detailed description given hereinbelow and the accompanying drawings which are given by way of illustration only, and thus are not limitative of the present invention.

DESCRIPTION OF REFERENCE NUMBER

Figure 1:
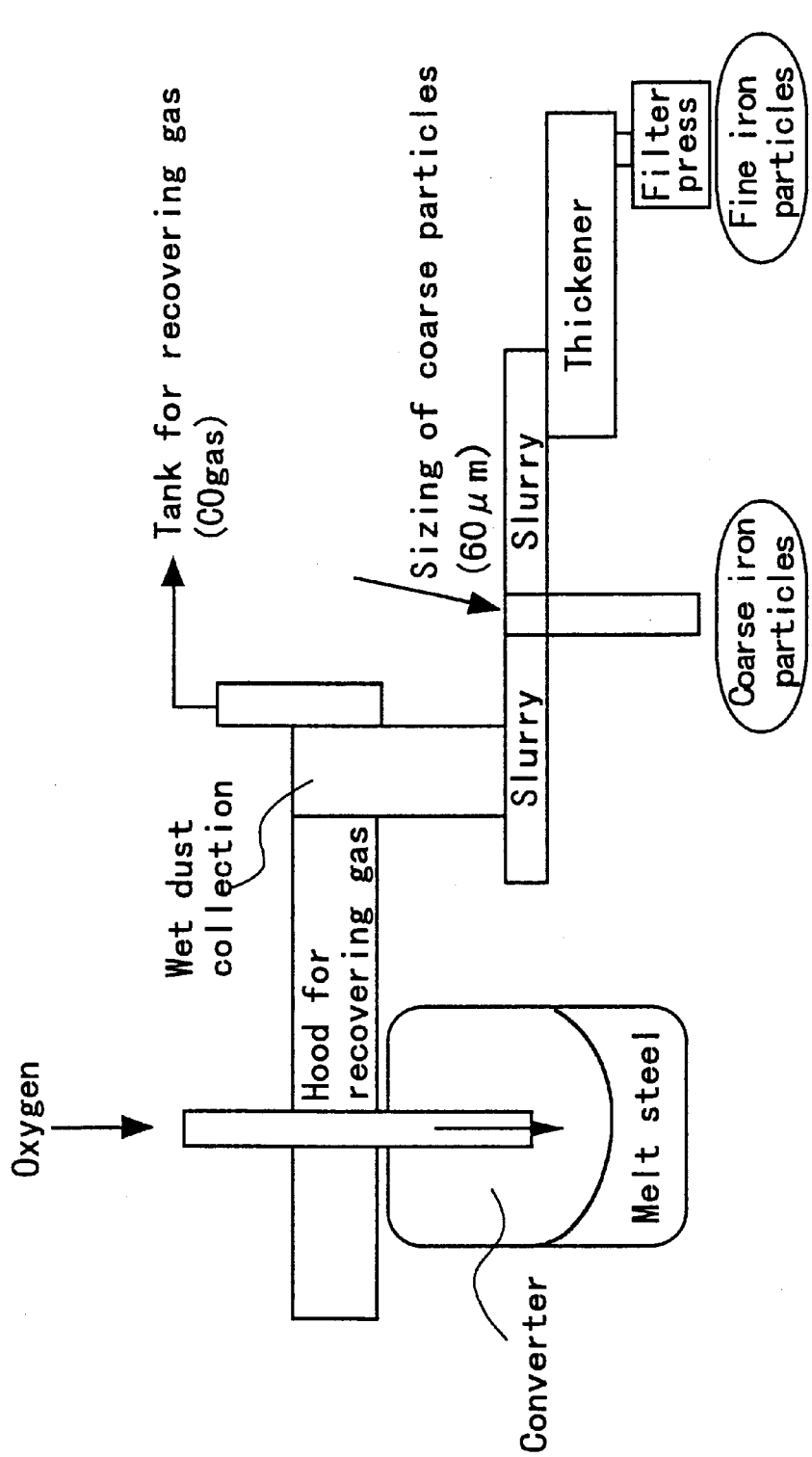
FIG. 1 is a flow chart showing preferred embodiment of the method for the reparation of fine iron particles according to the invention.
Figure 2:
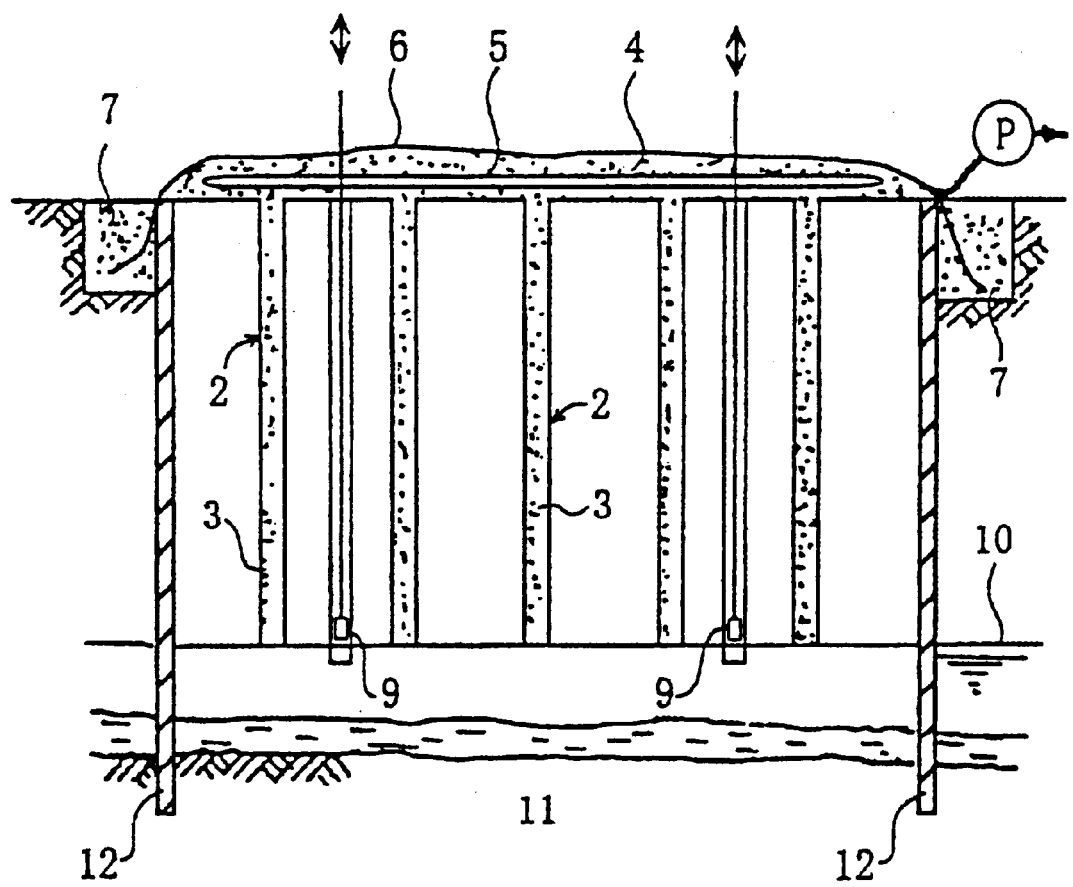
FIG. 2 is a section view showing preferred embodiment of the method for the remediation according to the invention.
Figure 3:
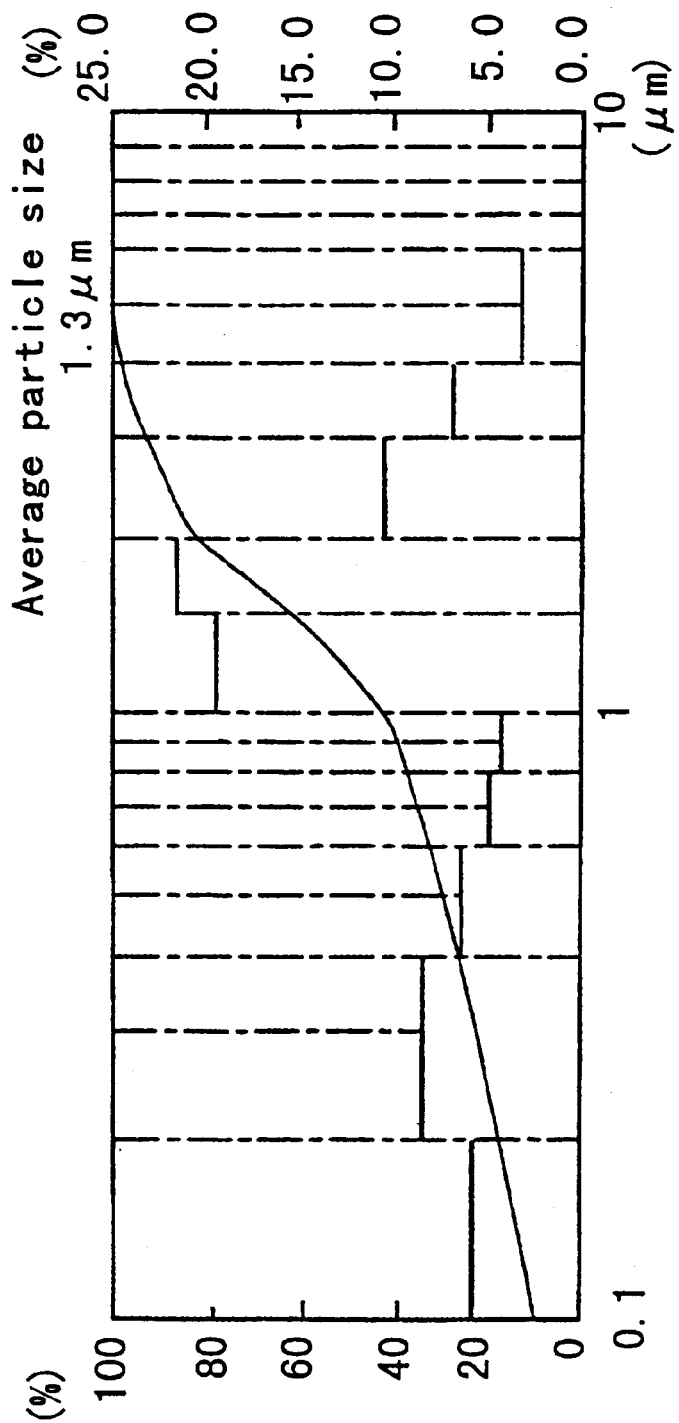
FIG. 3 is a graph showing the particle size contribution of the fine iron particles of the slurry obtained in Example 1.

2: Pervious column
3: Pervious materials
4: Horizontal pervious layer
5: Intake pipe
6: Impervious sheet 9: Injection pipe
11: Water-impermeable ground
12: Impervious layer

What is claimed is:

1. A remediation agent for contaminated soil, comprising a slurry of fine iron particles in which the fine iron particles in the form of spheres having an average particle size of less than 10 $\mu$m are dispersed in water by bubbles formed on the periphery of the particles.

2. The remediation agent for contaminated soil as defined in claim 1, wherein the average particle size of the fine iron particles are in the range of 0.1 to 6 $\mu$m.

3. The remediation agent for contaminated soil as defined in claim 1, which further contains an anti-oxidizing agent.

4. The remediation agent for contaminated soil as defined in claim 1, wherein the bubbles on the periphery of the fine iron particles are formed by a frother.

5. The remediation agent for contaminated soil as defined in claim 1, which further contains metal halide.

6. The remediation agent for contaminated soil as defined in claim 1, which further contains metal sulfate as a reducing agent.

7. The remediation agent for contaminated soil as defined in claim 1, which further contains inorganic carbonate or carbonate containing mineral.

8. The remediation agent for contaminated soil as defined in claim 4, wherein the frother is a decomposition product of animal protein or a saponification product of sodium abietate.

9. The remediation agent for contaminated soil as defined in claim 1, wherein the bubbles of the periphery of the iron powders are contained in the remediation agent in the amount of 5 to 80% by volume based on the whole agent.

10. The remediation agent for contaminated soil as defined in claim 1, wherein the contaminated soil contains an organic halide and/or a hexavalent chromium-containing compound as contaminant.

11. A remediation agent for contaminated soil, comprising a slurry of fine iron particles in which the fine iron particles in the form of spheres having an average particle size of less than 10 $\mu$m are dispersed in water, the fine iron particles being obtained by collecting a waste gas containing steel-making dust produced from an oxygen-blowing converter for steelmaking during refining by wet dust collection, and then removing gas to obtain a slurry of the steelmaking dust.

12. The remediation agent for contaminated soil as defined in claim 11, wherein, after the collecting of the waste gas, the steelmaking dust is collected by settling using a thickener to form a slurry of fine iron particles sludge.

13. The remediation agent for contaminated soil as defined in claim 11, wherein the average particle size of the fine iron particles are in the range of 0.1 to 6 $\mu$m.

14. The remediation agent for contaminated soil as defined in claim 11, wherein the contaminated soil contains an organic halide and/or a hexavalent chromium-containing compound as contaminant.

* * * * *